Patented Dec. 14, 1926.

1,610,998

UNITED STATES PATENT OFFICE.

JOHN W. CAIN, OF WILMONT, OHIO, ASSIGNOR TO EDWARD J. SMITH AND ELMER E. SMITH, BOTH OF CANTON, OHIO.

MOTOR FUEL.

No Drawing.    Application filed June 1, 1922. Serial No. 565,234.

The invention relates to liquid fuels for internal combustion engines; and one object of the invention is to utilize gasoline of a relatively low test to produce a fuel having greater power of combustion than the higher test gasoline in ordinary use. Another object is to produce a fuel giving a more uniform and rapid flame propagation, with less carbon residue than results from the use of ordinary gasoline, and a further object is to utilize a considerable portion of kerosene, to increase the power of the gasoline without detriment to the engine, and so as to reduce the cost of the fuel.

When kerosene is used alone, an excessive amount of carbon is formed which clogs the engine, an excessive amount of heat is created which overheats the engine, and a disagreeable and offensive odor is produced, accompanied by clouds of white smoke; and when kerosene is combined with gasoline, difficulty is experienced in preventing a separation of the mixture, which results in an alternate consumption of one or the other, thereby, from time to time, presenting the same difficulties which are encountered by the use of kerosene alone.

These difficulties are overcome, or greatly ameliorated, by combining with a mixture of gasoline and kerosene, a small portion of turpentine or terps, or other like distillate, which serves to form a homogeneous mixture of the petroleum distillate ingredients; to which may be added a small portion of pine tar previously thinned or diluted by gasoline or turpentine, which serves to overcome or neutralize the offensive odor, resulting from the use of kerosene.

A preferred method of making the improved fuel is to combine or mix one hundred gallons of gasoline of about 62° Baumé, with some thirty gallons of kerosene of about 42° Baume, and adding thereto about one-half gallon of turpentine or terps, and if desired, about four ounces of pine tar thinned or diluted with gasoline, all of which may be thoroughly mixed by any well known manner.

The improved fuel thus described, is cheaper than gasoline, and by its use an engine may be started more readily, accelerates more quickly, creates more power, produces less carbon, runs at higher speed and with smoother operation at low speeds, than when gasoline, either alone or combined with other petroleum distillates is used as fuel. It will be understood that the proportions of the ingredients may be varied within such limits as will result in a permanent mixture.

I claim:
1. A fuel consisting of gasoline, kerosene and turpentine.
2. A fuel consisting of gasoline, kerosene, turpentine and pine tar.
3. A fuel consisting of a mixture having substantially the proportions of one hundred parts gasoline, thirty parts kerosene, and one half part turpentine.
4. A fuel consisting of a mixture in substantially the proportions of one hundred gallons gasoline, thirty gallons kerosene, one half gallon turpentine and four ounces of diluted pine tar.
5. A fuel consisting mainly of gasoline and kerosene and containing turpentine.
6. A fuel consisting mainly of gasoline and kerosene and containing a relatively small amount of turpentine.
7. A fuel consisting mainly of gasoline and kerosene and containing turpentine and diluted pine tar.
8. A fuel consisting mainly of gasoline and kerosene and containing relatively small amounts of turpentine and diluted pine tar.

JOHN W. CAIN.